United States Patent Office 2,843,629
Patented July 15, 1958

2,843,629

RECOVERY OF FUMARIC ACID

John B. Rust, Verona, N. J., assignor, by direct and mesne assignments, of one-half to Montclair Research Corporation, Montclair, N. J., a corporation of New Jersey, and one-half to Ellis-Foster Company, a corporation of New Jersey No Drawing. Application June 23, 1953
Serial No. 363,669

8 Claims. (Cl. 260—537)

The present invention relates to fumaric acid, new methods for its production and particularly to new methods of its production from liquors containing maleic acid.

The invention relates more particularly to the production of fumaric acid from waste liquors resulting from the production of phthalic anhydride and maleic anhydride from naphthalene and benzene respectively and the like.

In the process of producing phthalic anhydride, the scrub liquor contains maleic acid as well as other organic compounds. In the process of producing maleic anhydride from the oxidation of benzene and other organic compounds, maleic acid is also present in the scrub liquor along with small quantities of other organic compounds. Such scrub liquors arise as by washing the product with water, or in the separation of the product from aqueous media, or in scrubbing industrial gases. In many cases these scrub liquors are discarded as of no value due to the difficulty of isolating from them any economical proportions of maleic acid. Furthermore, disposal of these scrub liquors presents a serious problem due to their toxicity and resultant stream polution. In general such waste liquors contain from 10% to 40% maleic acid as well as organic impurities in the form of organic oxidation products such as acids, aldehydes, quinones, ketones and the like and condensation and polymerization products.

It has been known as in U. S. Patents 2,454,387 and 2,548,687, that thiourea is a very efficient catalytic agent for the transformation of maleic acid into fumaric acid in aqueous medium. However, it is also known as in U. S. Patent No. 2,483,576 that certain organic compounds present as impurities in the waste liquor have the ability to inhibit the action of thiourea in its catalytic conversion of maleic into fumaric acid.

Among the objects of the present invention is included a method of pretreatment of the maleic containing scrub liquor to inactivate at least in part, and preferably entirely the impurities which inactivate or interfere with the isomerizing agent.

Other objects include such processes where the requirements of isomerizing agent are materially reduced in amount.

Other objects include the production of high yields of purer product.

Still further objects and advantages of the present invention will appear from the more detailed description set forth below, it being understood that such more detailed description is given by way of illustration and explanation only, and not by way of limitation since various changes therein may be made by those skilled in the art without departing from the scope and spirit of the present invention.

In accordance with the present invention it has been found that it is feasible to treat aqueous waste liquors containing maleic acid for the recovery of fumaric acid therefrom, to inactivate said impurities to prevent their interference with the recovery of fumaric acid, and also to improve the character of the fumaric product obtained, by pretreating the liquor with a sulfur dioxide agent. In this way, the impurities which inhibit the action of the isomerizing agent, such as thiourea and substituted thioureas, may be removed or inactivated. Desirably the sulfur dioxide agent is introduced and its effect obtained prior to the introduction of the isomerizing agent. By introducing sulfur dioxide or sulfur dioxide yielding compounds the amount of thiourea or thiourea derivatives required for isomerization, is substantially reduced resulting in a considerable saving in processing cost. Furthermore, the process of the present invention in utilizing sulfur dioxide or sulfur dioxide yielding compounds yields substantially paler colored liquors which result in substantially lighter color fumaric acid after isomerization. This light-colored fumaric acid is obtained, furthermore, after only one activated carbon treatment instead of two or more which is normally needed in prior art processes.

The purification pretreatment is desirably carried out at somewhat elevated temperatures in conjunction with activated carbon treatment, resulting in the production of a pale yellow colored maleic liquor from an initially black to dark reddish brown liquor.

Simultaneous treatment with the sulfur dioxide agent and decolorizing agent is preferable although successive steps may be used. The elevated temperatures referred to are below the boiling point of water under the conditions of use and may for example be from 60 to 90° C. But lower temperatures may be employed although the time of treatment may be lengthened. Any chemically inert decolorizing agent may be used, but activated carbon is desirable and will illustrate the invention.

The amount of sulfur dioxide, or sulfur dioxide yielding compounds depends to a great extent upon the nature and concentration of the impurities in the maleic liquor and is best determined by an experimental trial utilizing about 2% of thiourea based upon the maleic content of the liquors for ascertaining the effect of the conversion of maleic into fumaric acid.

By trying varying quantities of the sulfur dioxide agent, and applying the 2% thiourea isomerization test, the optimum amounts of agent for any given liquor is readily determined.

In addition to sulfur dioxide introduced or generated in situ in the liquor, sulfites and bisulfites may be employed. These are included under the term sulfur dioxide agent. Desirably water soluble agents are used, particularly those which do not give any interfering action such as insoluble precipitates with maleic or the acid e. g. mineral acid used. Mixtures of sulfur dioxide with the salts or mixtures of the salts may be employed. Acids used to generate sulfur dioxide in situ include particularly mineral acids such as sulfuric hydrochloric, nitric, phosphoric acids and the like. By using such combinations of sulfite and bisulfite salts with mineral acids, the ultimate effect is the introduction of $SO_2$ in situ since $SO_2$ is easily liberated from sulfite or bisulfite salts by means of mineral acids.

Any isomerizing agent may be used for treatment of the pretreated liquor. Such agents are in part well known and are sufficiently well illustrated by thiourea, substituted thioureas, mercaptan type agents or compounds generally formulated as R—SH where R may be a monovalent hydrocarbon or substituted non-functional monovalent hydrocarbon radical such as alkyl, cycloalkyl, aryl, aralkyl or $$R'.R''N-\overset{|}{C}=NR'''$$

where R', R" and R''' may be hydrogen or any monovalent group as set forth above. Examples of such isomerizing agents are thiourea, diethyl thiourea, allyl thiourea, dibutyl thiourea, acetyl thiourea, phenyl thiourea, cresyl disulfide, dithiofuorates, dithionaphthorates, etc.

An important new group of isomerizing agents that may be used in conjunction with the pretreated liquor of the present invention, includes the formamidine disulfides having the formula

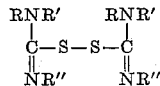

where R, R' and R'' may be the same or different substituents from hydrogen and monovalent groups including alkyl, aryl, cycloalkyl, alkaryl, heterocyclic and the like, and their non-functional substituted groups. Desirably these formamidine disulfides are used in the form of their salts such as the dihydrochloride, sulfate, phosphate, trichloroacetate, and the like. These formamidine disulfides as isomerizing agents are claimed per se in the companion application filed concurrently herewith Serial No. 363,668, filed June 23, 1953, entitled "Isomerization Agents," to which reference is hereby made. Examples of specific formamidine disulfides that may be used are formamidine disulfide dihydrochloride, N-phenyl formamidine disulfide dihydrochloride, ethylene formamidine disulfide dihydrochloride, diethyl formamidine disulfide dihydrochloride, allyl formamidine disulfide dihydrochloride, etc. The carbon atom content of the substituent groups in general will not contain more than about ten carbon atoms.

As illustrative of the sulfur dioxide agent, there may be mentioned, sulfur dioxide gas, sodium sulfite, sodium bisulfite, potassium sulfite, and potassium bisulfite, etc. Generally, acids should not be used in the pretreatment, when sulfites or bisulfites are employed.

The activated carbon acts as a decolorizing agent and has no substantial effect on the isomerization or yield obtained.

The following examples illustrate the invention, parts being by weight unless otherwise indicated.

Example 1

One liter of a dark reddish-brown waste maleic scrub liquor analyzing 15% of maleic acid by weight was heated to 80° C. and 5 gms. of sodium bisulfite added together with 20 gms. of activated carbon. The solution was boiled for 45 minutes, then filtered hot. The filtrate came through a very pale yellow color. 10 cc. of 37% hydrochloric acid was added followed by 5 gms. of thiourea. Fumaric acid began to form and precipitate from the solution almost immediately. The solution was allowed to cool to room temperature and to stand overnight. The fumaric acid was filtered, washed with a little cold water and dried. The yield was 135 gms. of fumaric acid almost white in color. This represented a conversion of 90% based on the maleic acid. A similar run without the sulfur dioxide gave a yield of about 72% and a brown colored product.

Example 2

One liter of a maleic scrub liquor identical with that used in Example 1 was heated to 90° C. with stirring with 20 gms. of activated carbon and 10 cc. of 37% HCl, then 5 gms. of sodium bisulfite added. Heating was continued for 45 minutes and the solution filtered hot. A very pale yellow filtrate was secured. At 70° C., 10 gms. of thiourea were added and the solution cooled and allowed to stand overnight. The fumaric acid which precipitated was filtered, washed with a small amount of cold water and dried. A yield of 143 gms. of a very light-colored fumaric acid was secured. This represented a conversion of 95% based on the maleic acid.

Example 3

One liter of waste maleic scrub liquor described in Example 1 was mixed with 10 cc. of 37% HCl and 20 gms. of activated carbon. Then 5 gms. of sodium bisulfite were added and heating and stirring continued at 90° C. for 30 minutes. The solution was filtered hot from the carbon to give a pale yellow filtrate. 10 gms. of thiourea were added along with 10 cc. of 37% HCl and 5 gms. of sodium bisulfite to introduce more $SO_2$ during isomerization. The solution was allowed to cool and stand overnight. The precipitated fumaric acid was filtered, washed with a small amount of water and dried. A very light-colored fumaric acid was obtained in 144 gms. yield. This represented a conversion of 96% based on the maleic acid.

Example 4

Two liters of maleic acid scrub liquor described in Example 1 were mixed with 50 gms. of activated carbon and 7 gms. of sodium sulfite and the mixture heated to 90° C. for 45 minutes. The solution was filtered hot to give a very pale yellow filtrate which was divided into two parts of one liter each. To one batch (A), there was added 10 gms. of thiourea and 15 gms. of sodium bisulfite and the solution cooled to room temperature and allowed to remain at room temperature for 48 hours. 20 cc. of 37% HCl were added and then the fumaric acid was filtered off, washed with a little cold water and dried. The yield was 135 gms. of light-colored fumaric acid representing a conversion of 90%. To another batch (B), there was added 2.5 gms. of thiourea and 3.75 gms. of sodium bisulfite and the solution cooled to room temperature and allowed to remain at room temperature for 48 hours. Twenty cubic centimeters of 37% HCl were added and then the fumaric acid was filtered off, washed with a little cold water and dried. The yield was also 135 gms. in this case of light-colored fumaric acid representing a conversion of 90%.

Example 5

Two liters of maleic scrub liquor described in Example 1 were mixed with 50 gms. of activated carbon and 7 gms. of sodium sulfite and heated to 90° C. with stirring for 45 minutes. The solution was filtered hot and divided into two one liter portions. To one portion (A) there was added 10 gms. of formamidine disulfide dihydrochloride (representing 7.5 gms. of free base) and 15 gms. of sodium bisulfite. The solution was cooled to room temperature and allowed to stand for 48 hours. Twenty cubic centimeters of 37% HCl were added and the fumaric acid filtered off, washed with a little cold water and dried. The yield of light-colored fumaric acid was 150 gms. representing a 100% conversion.

To another portion (B), there was added 2.5 gms. of formamidine disulfide dihydrochloride (representing 1.7 gms. of the free base) and 3.75 gms. of sodium bisulfite. The solution was cooled to room temperature and allowed to stand for 48 hours. Twenty cubic centimeters of 37% HCl were added and the fumaric acid filtered off, washed with a little cold water and dried. The yield of light colored fumaric acid was 122 gms. representing an 84.7% conversion.

Example 6

To each of four 1-liter beakers containing 500 cc. portions of waste maleic scrub liquor (15%) was added the following materials:

| | A, g. | B, g. | C, g. | D, g. |
|---|---|---|---|---|
| Activated carbon | 12.5 | 12.5 | 12.5 | 12.5 |
| Sodium bisulfite | 1.85 | 1.85 | 1.85 | 1.85 | and decolorized for 30 minutes at the following temperatures:

| A, °C. | B, °C. | C, °C. | D, °C. |
|---|---|---|---|
| 50-60 | 60-70 | 70-80 | 80-90 | then filtered and the following materials added while maintaining the temperature in the above ranges:

|  | A, g. | B, g. | C, g. | D, g. |
|---|---|---|---|---|
| Thiourea | 5 | 5 | 5 | 5 |
| Sodium bisulfite | 7.5 | 7.5 | 7.5 | 7.5 |

The solutions were allowed to stand overnight and the following day 10 cc. of 37% HCl were added to each and the solutions filtered and dried. The yields were:

| A, g. | B, g. | C, g. | D, g. |
|---|---|---|---|
| 65 | 66 | 65 | 67 |

From which it will be noted that isomerization is not affected by treating at different temperature ranges.

*Example 7*

To four 1-liter beakers each containing 500 cc. portions of waste maleic scrub liquor (15%) were added the following materials:

|  | A, g. | B, g. | C, g. | D, g. |
|---|---|---|---|---|
| Activated carbon | 12.5 | 12.5 | 12.5 | 12.5 |
| Sodium bisulfite | 1.75 | 1.75 | 1.75 | 1.75 | and heated to 90° C. for 30 minutes and filtered while hot. At 65° C. the following were then added:

|  | A, g. | B, g. | C, g. | D, g. |
|---|---|---|---|---|
| Thiourea | 2.6 | 3.4 | 4.2 | 5 |
| Sodium bisulfite | 3.9 | 5.1 | 6.3 | 7.5 |

The solutions were allowed to stand overnight and the following day to each was added 10 cc. of 37% HCl and the solutions filtered and dried. The yields obtained were:

| A, g. | B, g. | C, g. | D, g. |
|---|---|---|---|
| 36 | 43 | 55 | 64 |

It will be seen that the amount of catalyzer used for the isomerization greatly affects the yield obtained.

In the examples such as Example 1, etc., sulfur dioxide may be substituted in the pretreatment step by bubbling it through the solution under the conditions as in Example 1, etc., to produce a pretreated maleic material which may then be subjected to isomerization by any of the methods desired. Some methods of isomerization have been illustrated above with reference to the companion application for methods of using formamidine disulfides and its derivatives as the isomerization catalyst. The following examples taken from the companion application are illustrative.

*Example 8*

2 liters of a waste maleic scrub liquor having a dark reddish-brown color and analyzing 15% of maleic acid pretreated as set forth above for instance in Example 6, was filtered hot and divided into four 500 cc. was mixed with 50 gms. of activated carbon and boiled for about 1 hour. The solution was filtered hot to give an orange filtrate which was divided into four 500 cc. portions designated A, B, C, D. To these portions was added:

|  | A, g. | B, g. | C, g. | D, g. |
|---|---|---|---|---|
| Formamidine disulphide dihydrochloride | 3.75 | 3.75 | 3.75 | 3.75 |
| Sodium bisulfite | 3.75 | 5.6 | 7.5 | 10 | and allowed to stand overnight. The following day to each portion was added 10 cc. of 37% HCl and the solutions filtered and dried. The yields obtained were:

| A, g. | B, g. | C, g. | D, g. |
|---|---|---|---|
| 69 | 67 | 65 | 65 |

It may be seen that the varying proportions of sodium bisulfite used had little effect on the isomerization.

*Example 9*

To each of four 1-liter beakers containing 500 cc. portions of waste maleic scrub liquor (15%) was added the following materials:

|  | A, g. | B, g. | C, g. | D, g. |
|---|---|---|---|---|
| Activated carbon | 7.5 | 10 | 12.5 | 15 |
| Sodium bisulfite | 1.75 | 1.75 | 1.75 | 1.75 | and decolorized at 90° C. for 30 minutes, then filtered while hot. To each at 65° C. the following materials were added:

|  | A, g. | B, g. | C, g. | D, g. |
|---|---|---|---|---|
| Formamidine disulphide dihydrochloride | 3.75 | 3.75 | 3.75 | 3.75 |
| Sodium bisulfite | 5.6 | 5.6 | 5.6 | 5.6 | and allowed to stand overnight. The following day to each portion was added 10 cc. of 37% HCl and the solutions filtered and dried. The yields obtained were:

| A, g. | B, g. | C, g. | D, g. |
|---|---|---|---|
| 71 | 73 | 73 | 73 |

Since the yield obtained were almost identical it may be seen that the amount of activated carbon had no effect on the isomerization.

*Example 10*

To each of four 1-liter beakers containing 500 cc. portions of waste maleic scrub liquor (15%) was added the following materials:

|  | A, g. | B, g. | C, g. | D, g. |
|---|---|---|---|---|
| Activated carbon | 12.5 | 12.5 | 12.5 | 12.5 |
| Sodium bisulfite | 1.85 | 1.85 | 1.85 | 1.85 | and decolorized for 30 minutes at the following temperatures:

| A, °C. | B, °C. | C, °C. | D, °C. |
|---|---|---|---|
| 50-60 | 60-70 | 70-80 | 80-90 | then filtered and the following materials added while maintaining the temperature in the above ranges:

|  | A, g. | B, g. | C, g. | D, g. |
|---|---|---|---|---|
| Formamidine disulphide dihydrochloride | 3.75 | 3.75 | 3.75 | 3.75 |
| Sodium bisulfite | 5.6 | 5.6 | 5.6 | 5.6 |

The solutions were allowed to stand overnight and the following day 10 cc. of 37% HCl were added to each and the solutions filtered and dried. The yields were:

| A, g. | B, g. | C, g. | D, g. |
|---|---|---|---|
| 67 | 67 | 67 | 69 |

From which it will be noted that isomerization is not affected by treating at different temperature ranges.

*Example 11*

To four 1-liter beakers each containing 500 cc. portions of waste maleic scrub liquor (15%) were added the following materials:

|  | A, g. | B, g. | C, g. | D, g. |
|---|---|---|---|---|
| Activated carbon | 12.5 | 12.5 | 12.5 | 12.5 |
| Sodium bisulfite | 1.75 | 1.75 | 1.75 | 1.75 | and heated to 90° C. for 30 minutes and filtered while hot. At 65° C. the following were then added:

|  | A, g. | B, g. | C, g. | D, g. |
|---|---|---|---|---|
| Formamidine disulphide dihydrochloride | 0.72 | 1.40 | 2.2 | 2.9 |
| Sodium bisulfite | 1.08 | 2.1 | 3.3 | 4.35 |

The solutions were allowed to stand overnight and the following day to each was added 10 cc. of 37% HCl and the solutions filtered and dried. The yields obtained were:

| A, g. | B, g. | C, g. | D, g. |
|---|---|---|---|
| 32 | 52 | 58 | 65 |

It will be seen that the amount of catalyzer used for the isomerization greatly affects the yield obtained.

Having thus set forth my invention, I claim:

1. In a process of treating aqueous waste liquors containing maleic acid for the recovery of fumaric acid therefrom, said waste liquor containing impurities which interfere with isomerization of maleic to fumaric acid said impurities inactivated by a sulfur dioxide agent to prevent interference with fumaric acid recovery, the step of isomerizing the maleic acid in the pressure of a formamidine disulfide isomerizing agent therein to fumaric acid, and recovering the fumaric acid.

2. The method of claim 1 in which the sulfur dioxide agent is sulfur dioxide.

3. The method of claim 1 in which the sulfur dioxide agent is a sulfite.

4. The method of claim 1 in which the sulfur dioxide agent is a bisulfite.

5. In a process of converting maleic acid into fumaric acid in aqueous waste liquors containing the same, by treatment of the liquor with an isomerizing agent that converts maleic acid into fumaric acid, said liquor containing impurities which interfere with said conversion, the steps which comprise treating said solution with a sulfur dioxide agent to inactivate said impurities at least in part, and isomerizing maleic acid by an isomerizing agent in said treated liquor, the isomerizing agent being selected from the group consisting of formamidine disulfide, N-phenyl formamidine disulfide, ethylene formamidine disulfide, diethyl formamidine disulfide, allyl formamidine disulfide, and their salts.

6. The method of claim 5 in which the sulfur dioxide agent is sulfur dioxide.

7. The method of claim 5 in which the sulfur dioxide agent is a sulfite.

8. The method of claim 5 in which the sulfur dioxide agent is a bisulfite.

References Cited in the file of this patent
UNITED STATES PATENTS

| 1,401,937 | Bailey | Dec. 27, 1921 |
| 2,414,066 | Scott | Jan. 7, 1947 |
| 2,454,385 | Howland et al. | Nov. 23, 1948 |
| 2,483,576 | deVegvar | Oct. 4, 1949 |